United States Patent
Shao et al.

(10) Patent No.: US 11,764,362 B2
(45) Date of Patent: Sep. 19, 2023

(54) ELECTRODE PLATE AND ELECTRODE ASSEMBLY USING THE SAME

(71) Applicant: Ningde Amperex Technology Ltd., Ningde (CN)

(72) Inventors: Ying Shao, Ningde (CN); Li Xiang, Ningde (CN); Bin Wang, Ningde (CN); Qiaoshu Hu, Ningde (CN)

(73) Assignee: NINGDE AMPEREX TECHNOLOGY LTD., Ningde (CN)

( * ) Notice: Subject to any disclaimer, the term of this patent is extended or adjusted under 35 U.S.C. 154(b) by 258 days.

(21) Appl. No.: 16/427,572

(22) Filed: May 31, 2019

(65) Prior Publication Data
US 2020/0313196 A1    Oct. 1, 2020

(30) Foreign Application Priority Data
Mar. 25, 2019   (CN) .................. 201910228385.X

(51) Int. Cl.
*H01M 4/66*  (2006.01)
*H01M 10/0587*  (2010.01)
(Continued)

(52) U.S. Cl.
CPC ........... *H01M 4/667* (2013.01); *H01M 4/661* (2013.01); *H01M 4/668* (2013.01);
(Continued)

(58) Field of Classification Search
None
See application file for complete search history.

(56) References Cited

U.S. PATENT DOCUMENTS

| | | | | |
|---|---|---|---|---|
| 2010/0285353 A1* | 11/2010 | Katayama | ........... | H01M 50/543 429/185 |
| 2015/0207111 A1* | 7/2015 | Tao | ..................... | H01M 50/538 429/162 |

(Continued)

FOREIGN PATENT DOCUMENTS

| CN | 1787274 A | 6/2006 |
|---|---|---|
| CN | 104600250 A | 5/2015 |

(Continued)

OTHER PUBLICATIONS

Office Action dated Apr. 1, 2022, issued in counterpart CN application No. 201910228385.X with English translation. (23 pages).

*Primary Examiner* — Wyatt P McConnell
(74) *Attorney, Agent, or Firm* — WHDA, LLP

(57) ABSTRACT

An electrode plate for a lithium battery includes a composite current collector, a first active material layer, and a first electrode tab. The composite current collector includes a polymer layer and first metallic layer thereon. The first active material layer is disposed on a surface of the first metallic layer facing away from the polymer layer. The first active material layer defines a first receiving groove at an edge of the first active material layer. The first electrode tab is received in the first receiving groove, and is electrically connected to the first metallic layer. The thickness of the first electrode tab can be varied according to the electrical resistance desired. Thus, a high resistance of the first electrode tab is avoided.

12 Claims, 9 Drawing Sheets

(51) Int. Cl.
    *H01M 50/533*     (2021.01)
    *H01M 50/536*     (2021.01)
    *H01M 10/04*       (2006.01)
    *H01M 10/0525*    (2010.01)
    *H01M 50/534*     (2021.01)
    *H01M 4/02*        (2006.01)
    *H01M 50/538*     (2021.01)
    *H01M 10/052*     (2010.01)

(52) U.S. Cl.
    CPC ... *H01M 10/0431* (2013.01); *H01M 10/0525* (2013.01); *H01M 10/0587* (2013.01); *H01M 50/533* (2021.01); *H01M 50/534* (2021.01); *H01M 50/536* (2021.01); *H01M 10/052* (2013.01); *H01M 50/538* (2021.01); *H01M 2004/021* (2013.01); *Y02E 60/10* (2013.01)

(56) References Cited

U.S. PATENT DOCUMENTS

2015/0349373 A1*   12/2015   Snyder ................. H01M 4/70
                                                                                  429/162
2019/0379027 A1*   12/2019   Fukunaga ........... H01M 50/572
2020/0373584 A1*   11/2020   Morin ............... H01M 10/0525

FOREIGN PATENT DOCUMENTS

| | | |
|---|---|---|
| CN | 204946995 U | 1/2016 |
| CN | 108428849 A | 8/2018 |
| JP | 2000208129 A | 7/2000 |

\* cited by examiner

ELECTRODE PLATE AND ELECTRODE ASSEMBLY USING THE SAME

FIELD

The subject matter herein generally relates to an electrode plate and an electrode assembly using the electrode plate.

BACKGROUND

Due to a high operating voltage, high energy density, low self-discharge, and long service life, lithium batteries have become ideal energy sources for instruments and meters, as well as the preferred power sources for automotive electronics.

The lithium battery may use metallic foil (for example, copper foil, aluminum foil, or nickel foil) as a current collector. The lithium battery may also use a composite current collector, which can increase safety and decrease the weight of the lithium battery. The composite current collector includes a polymer layer and a metallic layer disposed on the polymer layer. A portion of the metallic layer protrudes from the polymer layer to form an electrode tab of the lithium battery. However, the metallic layer is much thinner than the metallic foil, causing the electrode tab area to have a large resistance. Furthermore, the electrode tab area of the metallic layer may be crushed during successive cold pressing, which decreases the electrical conductivity of the metallic layer.

SUMMARY

What is needed, is an electrode plate and an electrode assembly using the electrode plate, to avoid a greater resistance of the electrode tab.

The present disclosure provides an electrode plate. The electrode plate includes a composite current collector including a polymer layer and a first metallic layer disposed on the polymer layer. A first active material layer is disposed on a surface of the first metallic layer facing away from the polymer layer. The first active material layer defines a first receiving groove at an edge of the first active material layer. A first electrode tab is received in the first receiving groove and is electrically connected to the first metallic layer.

In one embodiment, the composite current collector further includes a second metallic layer disposed on a surface of the polymer layer facing away from the first metallic layer. The electrode plate further includes a second active material layer and a second electrode tab, the second active material layer disposed on a surface of the second metallic layer facing away from the polymer layer. The second active material layer defines a second receiving groove at an edge of the second active material layer, the second receiving groove facing the first receiving groove, and the second electrode tab received in the second receiving groove is electrically connected to the second metallic layer.

In one embodiment, a top of the first electrode tab away from the first receiving groove is connected to a top of the second electrode tab away from the second receiving groove.

In one embodiment, the electrode plate further includes a third electrode tab and a fourth electrode tab. The first active material layer and the second active material layer further define a third receiving groove and a fourth receiving groove, respectively, the third receiving groove facing the fourth receiving groove, and the third electrode tab received in the third receiving groove is electrically connected to the first metallic layer, and the fourth electrode tab received in the fourth receiving groove is electrically connected to the second metallic layer.

In one embodiment, the first metallic layer includes a blank area facing the first receiving groove, and the blank area comprises a side portion, and the side portion defines a slot that passes through the first metallic layer along a thickness direction of the electrode plate.

In one embodiment, the electrode plate further includes an adhesive layer. The adhesive layer is disposed on a surface of the first electrode tab facing away from the first metallic layer, and the first tab is electrically connected to the first metallic layer by soldering, and the adhesive layer covers at least a soldering area between the first electrode tab and the first metallic layer.

In one embodiment, the first active material layer includes a bottom surface at a region corresponding to the first receiving groove, and the adhesive layer does not extend beyond the bottom surface of the first active material layer.

In one embodiment, along a width direction of the electrode plate, a projection of the first electrode tab on the first metallic layer overlaps at least a portion of the first metallic layer, and the soldering area is between 20 percent and 100 percent of an overlapping area between the projection of the first electrode tab and the first metallic layer.

In one embodiment, along a length direction of the electrode plate, a length of the first electrode tab is between 30 percent and 100 percent of a length of the first receiving groove.

The present disclosure further provides an electrode assembly including a positive electrode plate and a negative electrode plate, the positive electrode plate and the negative electrode plate winding to form the electrode assembly. At least one of the positive electrode plate and the negative electrode plate includes a composite current collector including a polymer layer and a first metallic layer disposed on the polymer layer. A first active material layer is disposed on a surface of the first metallic layer facing away from the polymer layer, the first active material layer defining a first receiving groove at an edge of the first active material layer. A first electrode tab is received in the first receiving groove and is electrically connected to the first metallic layer.

In one embodiment, the composite current collector further includes a second metallic layer disposed on a surface of the polymer layer facing away from the first metallic layer. The electrode assembly further includes a second active material layer and a second electrode tab. The second active material layer is disposed on a surface of the second metallic layer facing away from the polymer layer. The second active material layer defines a second receiving groove at an edge of the second active material layer. The second receiving groove faces the first receiving groove. The second electrode tab received in the second receiving groove is electrically connected to the second metallic layer.

In one embodiment, a top of the first electrode tab away from the first receiving groove is connected to a top of the second electrode tab away from the second receiving groove.

In one embodiment, the electrode plate further includes a third electrode tab and a fourth electrode tab. The first active material layer and the second active material layer further define a third receiving groove and a fourth receiving groove, respectively, the third receiving groove facing the fourth receiving groove, the third electrode tab received in the third receiving groove is electrically connected to the first metallic layer. The fourth electrode tab received in the fourth receiving groove is electrically connected to the second metallic layer.

In one embodiment, the first metallic layer includes a blank area facing the first receiving groove. The blank area includes a side portion. The side portion defines a slot that passes through the first metallic layer along a thickness direction of the electrode plate.

In one embodiment, the electrode plate further includes an adhesive layer disposed on a surface of the first electrode tab facing away from the first metallic layer, the first tab electrically connected to the first metallic layer by soldering. The adhesive layer covers at least a soldering area between the first electrode tab and the first metallic layer.

In one embodiment, the first active material layer includes a bottom surface at a region corresponding to the first receiving groove, and the adhesive layer does not extend beyond the bottom surface of the first active material layer.

In one embodiment, along a width direction of the electrode plate, a projection of the first electrode tab on the first metallic layer overlaps at least a portion of the first metallic layer. The soldering area is between 20 percent and 100 percent of an overlapping area between the projection of the first electrode tab and the first metallic layer.

In one embodiment, along a length direction of the electrode plate, a length of the first electrode tab is between 30 percent and 100 percent of a length of the first receiving groove.

In the electrode plate of the present disclosure, the thickness of the first electrode tab can be varied according to desired resistance. Thus, a high resistance of the first electrode tab is avoided. Moreover, by defining the slot at the blank area of the first metallic layer or the second metallic layer 13, the side of the slot 141 can be separated from the active material layer, which facilitates stress release during cold pressing. Thus, crushing and consequent decrease of electrical conductivity of the metallic layer are avoided.

BRIEF DESCRIPTION OF THE DRAWINGS

Implementations of the present disclosure will now be described, by way of embodiments, with reference to the attached figures.

DETAILED DESCRIPTION

Figure 1:
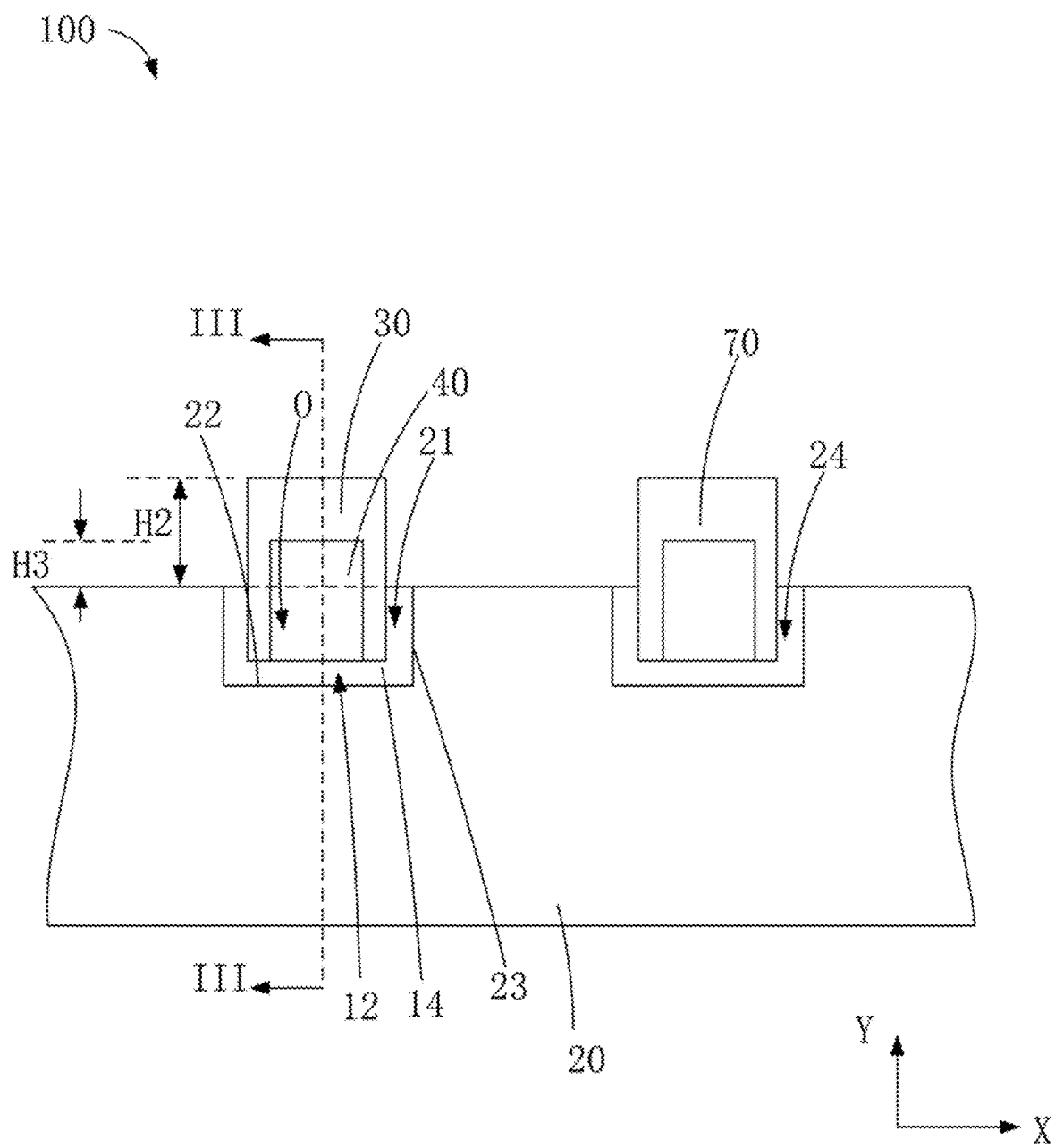
FIG. 1 is a side view of an embodiment of an electrode plate.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

Figure 2:
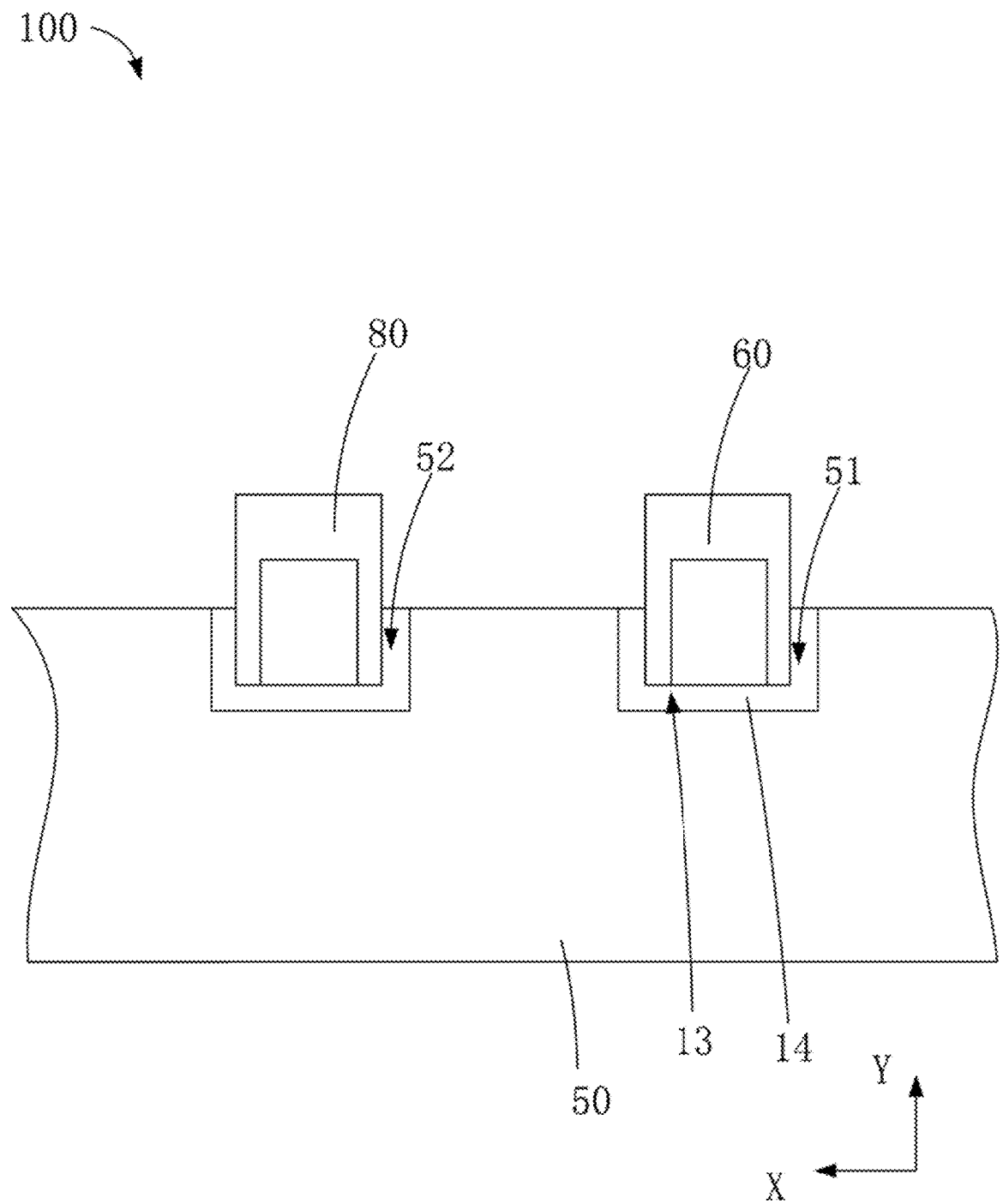
FIG. 2 is similar to FIG. 1, but showing the electrode plate from another angle.
Figure 3:
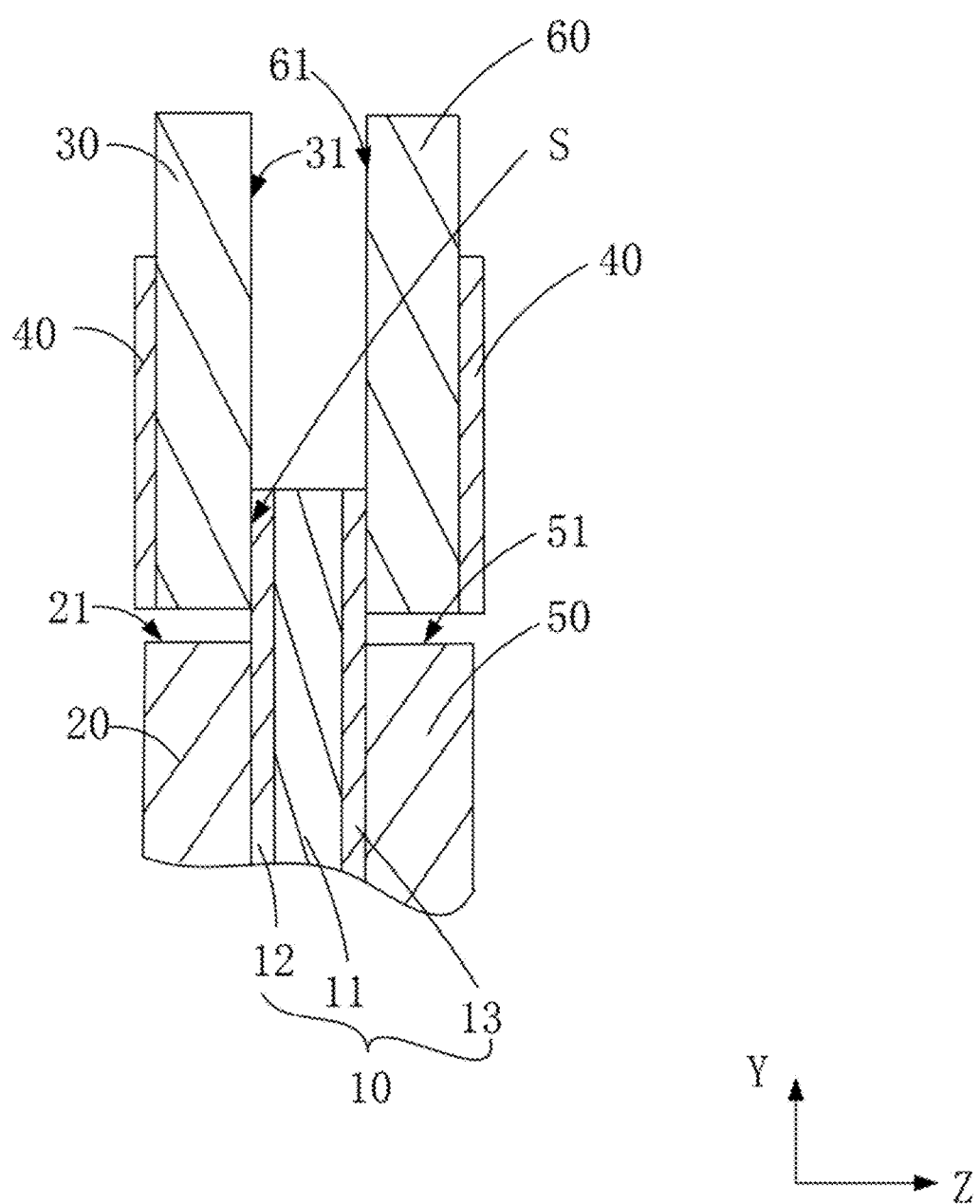
FIG. 3 is a cross-sectional view along line of FIG. 1.

FIGS. 1 to 3 illustrate an embodiment of an electrode plate 100. The electrode plate 100 includes a composite current collector 10, a first active material layer 20, and a first electrode tab 30. The composite current collector 10 includes a polymer layer 11 and a first metallic layer 12 disposed on the polymer layer 11. The first active material layer 20 is disposed on a surface of the first metallic layer 12 facing away from the polymer layer 11. The first active material layer 20 defines a first receiving groove 21 at an edge of the first active material layer 20. The first electrode tab 30 is received in the first receiving groove 21, and is electrically connected to the first metallic layer 12.

The existing electrode tab protrudes from the metallic layer of the composite current collector 10. Resistance thereof may be great due to the thinness of the metallic layer. However, in the present disclosure, the first electrode tab 30 is embedded in the first active material layer 20 and does not protrude from the first metallic layer 12. The thickness of the first electrode tab 30 can be varied according to desired resistance. Thus, a greater resistance of the first electrode tab 30 can be avoided.

In at least one embodiment, the polymer layer 11 can be made of a material selected from a group consisting of polytene (PE), polyethylene terephthalate (PET), polyimide (PI), poly(ether-ether-ketone) (PEEK), and any combination thereof. The polymer layer 11 can have a thickness of 1 μm to 20 μm. Preferably, the thickness of the polymer layer 11 is 5 μm to 15 μm. The first metallic layer 12 can be made of a metal with good electrical conductivity, for example, the first metallic layer 12 can be made of copper, aluminum, or nickel. The first metallic layer 12 can have a thickness of 0.1 μm to 5 μm. Preferably, the thickness of the first metallic layer 12 is 0.5 μm to 3 μm.

The first active material layer 20 can be made of a material selected from a group consisting of lithium cobalt oxide, lithium nickel oxide, lithium manganese oxide, and polyanion cathode materials.

The first electrode tab 30 can be made of a metal with good electric conductivity, for example, the first electrode tab 30 can be made of copper, aluminum, or nickel. The first electrode tab 30 can have a thickness of 5 μm to 100 μm. Preferably, the thickness of the first electrode tab 30 is 5 μm to 50 μm. The thickness of the first electrode tab 30 can be greater than the thickness of the first metallic layer 12. In at least one embodiment, along a length direction of the electrode plate 100, the length of the first electrode tab 30 is between 30 percent and 100 percent of the length of the first receiving groove 21. Preferably, the length of the first electrode tab 30 is between 50 percent and 90 percent of the length of the first receiving groove 21. The first active material layer 20 includes a bottom surface 22 at a region corresponding to the first receiving groove 21. A distance between the bottom of the first electrode tab 30 and the bottom surface 22 is 2 mm to 30 mm. Preferably, the distance is 2 mm to 10 mm. The first electrode tab 30 is higher than the first active material layer 20 by height H2, which is 5 mm to 50 mm. Preferably, the height H2 is 5 mm to 25 mm.

In at least one embodiment, the first electrode tab 30 is electrically connected to the first metallic layer 12 by soldering. Referring to FIG. 1, along a width direction of the electrode plate 100, a projection of the first electrode tab 30 on the first metallic layer 12 overlaps at least a portion of the first metallic layer 12, to form an overlapping area O therebetween. A soldering area S (see FIG. 3) between the first electrode tab 30 and the first metallic layer 12 is between 20 and 100 percent of the overlapping area O between the projection of the first electrode tab 30 and the first metallic layer 12.

To avoid short circuits caused by soldering whiskers and successive electrode tab bending, the electrode plate 100 further includes an adhesive layer 40. The adhesive layer 40 is disposed on a surface of the first electrode tab 30 facing away from the first metallic layer 12. The adhesive layer 40 covers at least the soldering area S between the first electrode tab 30 and the first metallic layer 12.

The adhesive layer 40 has a thickness of 5 µm to 40 µm. Preferably, the thickness of the adhesive layer 40 is 5 µm to 15 µm. A sum of the thickness of the first electrode tab 30 and the thickness of the adhesive layer 40 can be greater than the thickness of the first active material layer 20. In another embodiment, the sum of the thickness of the first electrode tab 30 and the thickness of the adhesive layer 40 can also be equal to or less than the thickness of the first active material layer 20, which facilitates subsequent assembly process of the battery. Furthermore, a projection at the adhesive layer 40 is avoided, which renders a smooth surface to the battery.

The length direction, the width direction, and the thickness direction of the electrode plate 100 can be defined as X-axis, Y-axis, and Z-axis respectively, of a three-dimensional coordinate system. Along the length direction of the electrode plate 100 (that is, the X-axis), the length of the adhesive layer 40 is less than the length of the first receiving groove 21. Along the width direction of the electrode plate 100 (that is, the Y-axis), the adhesive layer 40 does not extend beyond the bottom surface 22 of the first active material layer 20. The adhesive layer 40 is higher than the first metallic layer 12 by a height H3, which is 2 mm to 30 mm. Preferably, the height H3 is 2 mm to 10 mm.

In at least one embodiment, the composite current collector 10 further includes a second metallic layer 13. The second metallic layer 13 is disposed on a surface of the polymer layer 11 facing away from the first metallic layer 12. The electrode plate 100 further includes a second active material layer 50 and a second electrode tab 60. The second active material layer 50 is disposed on a surface of the second metallic layer 13 facing away from the polymer layer 11. The second active material layer 50 defines a second receiving groove 51 at an edge of the second active material layer 50. The second receiving groove 51 faces the first receiving groove 21. The second electrode tab 60 is received in the second receiving groove 51, and is electrically connected to the second metallic layer 13. The second metallic layer 13 can have same structure and same material as those of the first metallic layer 12. The second active material layer 50 can have same structure and same material as those of the first active material layer 20. The second electrode tab 60 can have same structure and same material as those of the first electrode tab 30.

In this embodiment, the composite current collector 10 is double-sided. Because the first metallic layer 12 and the second metallic layer 13 are positioned at opposite surfaces of the polymer layer 11, the first metallic layer 12 and the second metallic layer 13 are electrically isolated from each other. Thus, the first electrode tab 30 and the second electrode tab 60 are electrically connected to the first metallic layer 12 and the second metallic layer 13 respectively. When the first electrode tab 30 and the second electrode tab 60 are connected to each other, electrons from the first metallic layer 12 and the second metallic layer 13 can pass out from the composite current collector 10.

Figure 4:
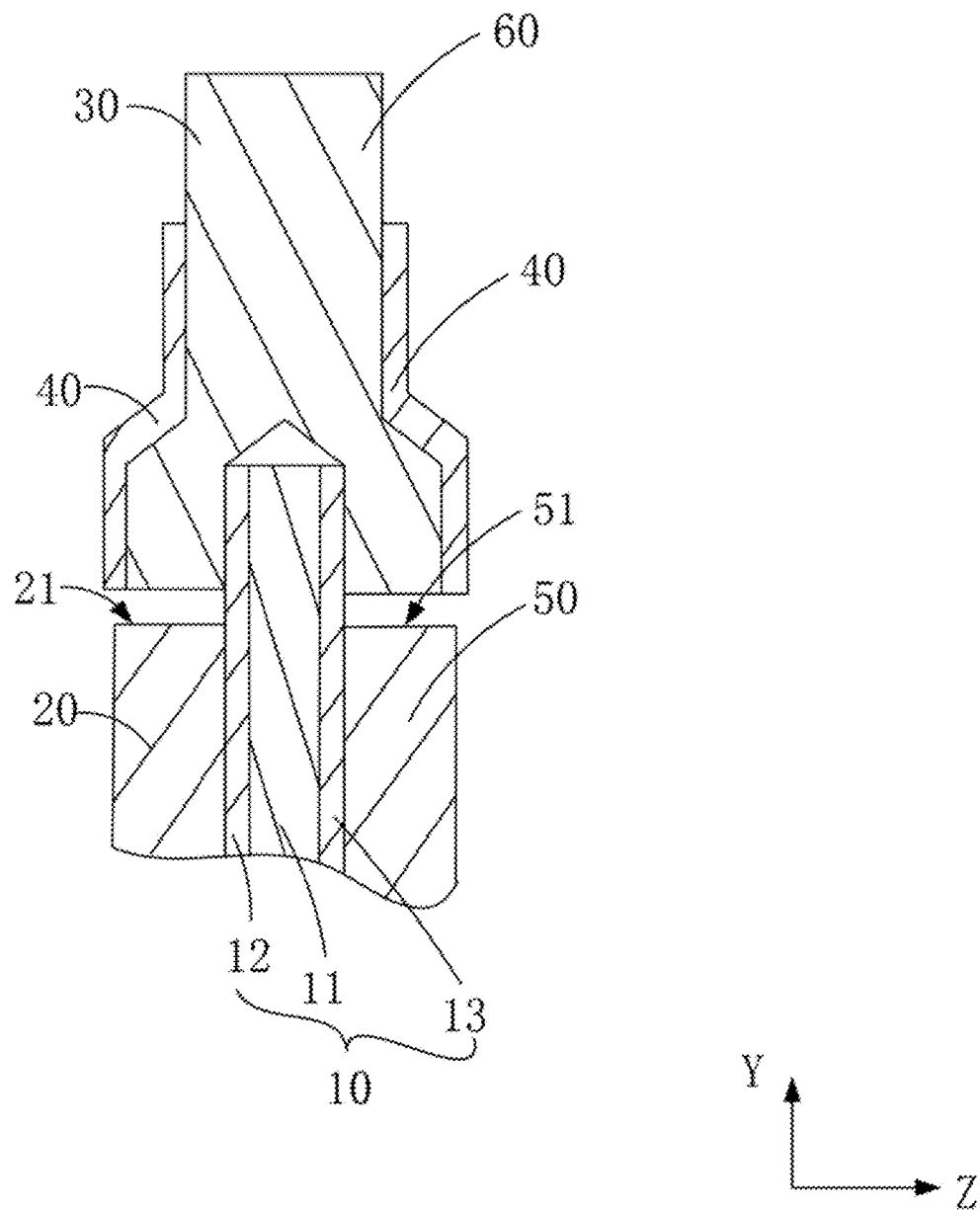
FIG. 4 is similar to FIG. 3, but showing another embodiment of an electrode plate.
Figure 5:
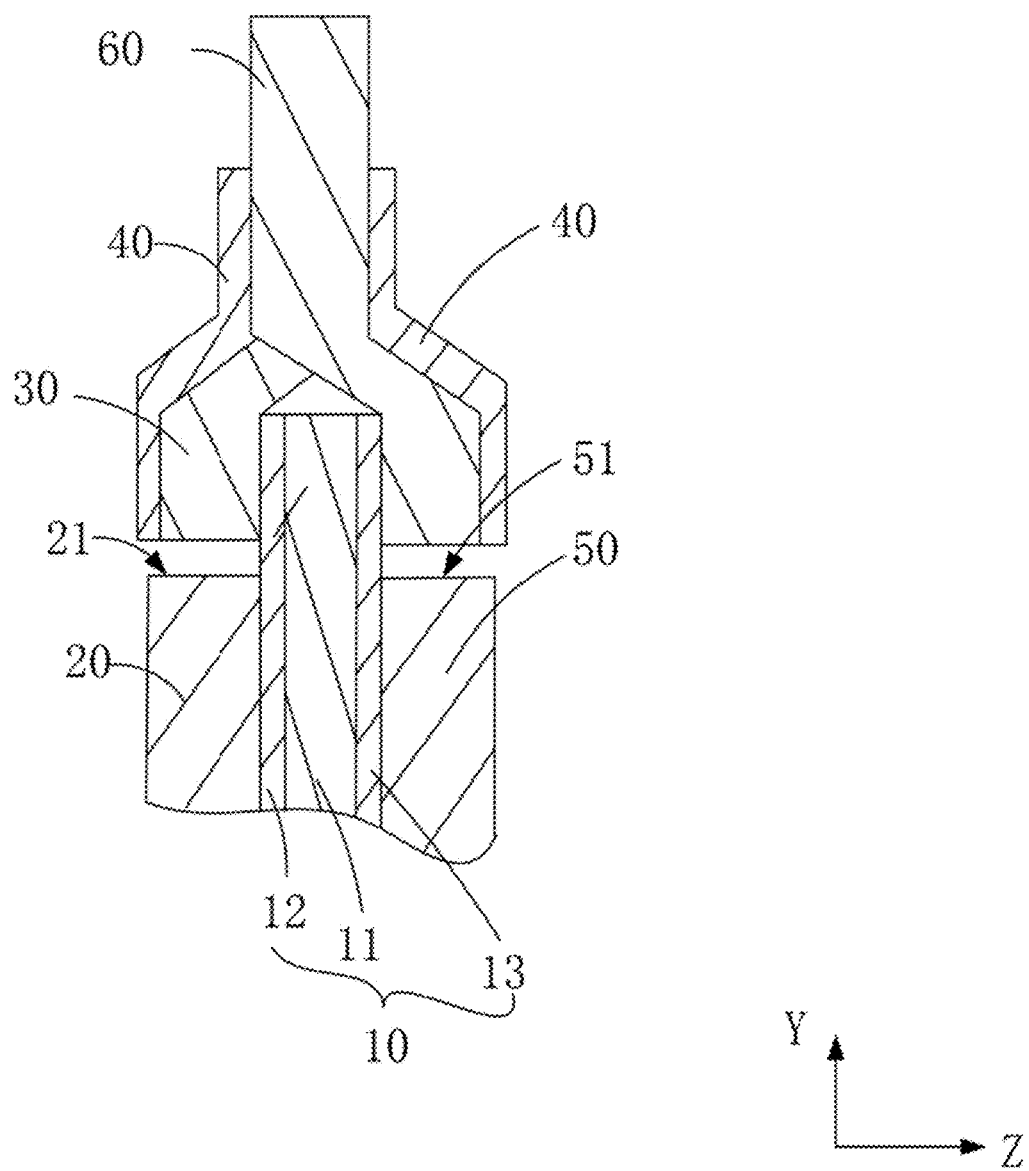
FIG. 5 is similar to FIG. 3, but showing yet another embodiment of an electrode plate.

Referring to FIG. 4, in at least one embodiment, the top of the first electrode tab 30 away from the first receiving groove 21 is connected to the top of the second electrode tab 60 away from the second receiving groove 51. Thus, the first electrode tab 30 and the second electrode tab 60 can be electrically connected to each other. The top of the first electrode tab 30 includes a first surface 31 facing the second electrode tab 60. The top of the second electrode tab 60 includes a second surface 61 facing the first electrode tab 30. The first surface 31 covers and connects to the second surface 61, causing the first tab 30 and the second tab 60 to be k-shaped. In other embodiment, an edge of the top of the first electrode tab 30 is connected to an edge of the top of the second electrode tab 60, to cause the top of the first electrode tab 30 to be coplanar with the top of the second electrode tab 60. That is, the first electrode tab 30 and the second electrode tab 60 cooperatively form a "one-piece" electrode tab. The one-piece electrode tab includes a "one-piece" top portion, which forms the top of the first electrode tab 30 and the top of the second electrode tab 60. The one-piece electrode tab further includes a bottom portion, which is disposed into the bottom of the first electrode tab 30 received in the first receiving groove 21 and the bottom of the second electrode tab 60 received in the second receiving groove 51.

In at least one embodiment, the first metallic layer 12 and/or the second metallic layer 13 include a blank area 14. The blank area 14 faces the first receiving groove 21 or the second receiving groove 51. In other words, the blank area 14 is an area of the first metallic layer 21 not covered by the first active material layer 20, or an area of the second metallic layer 13 not covered by the second active material layer 50.

Figure 6:
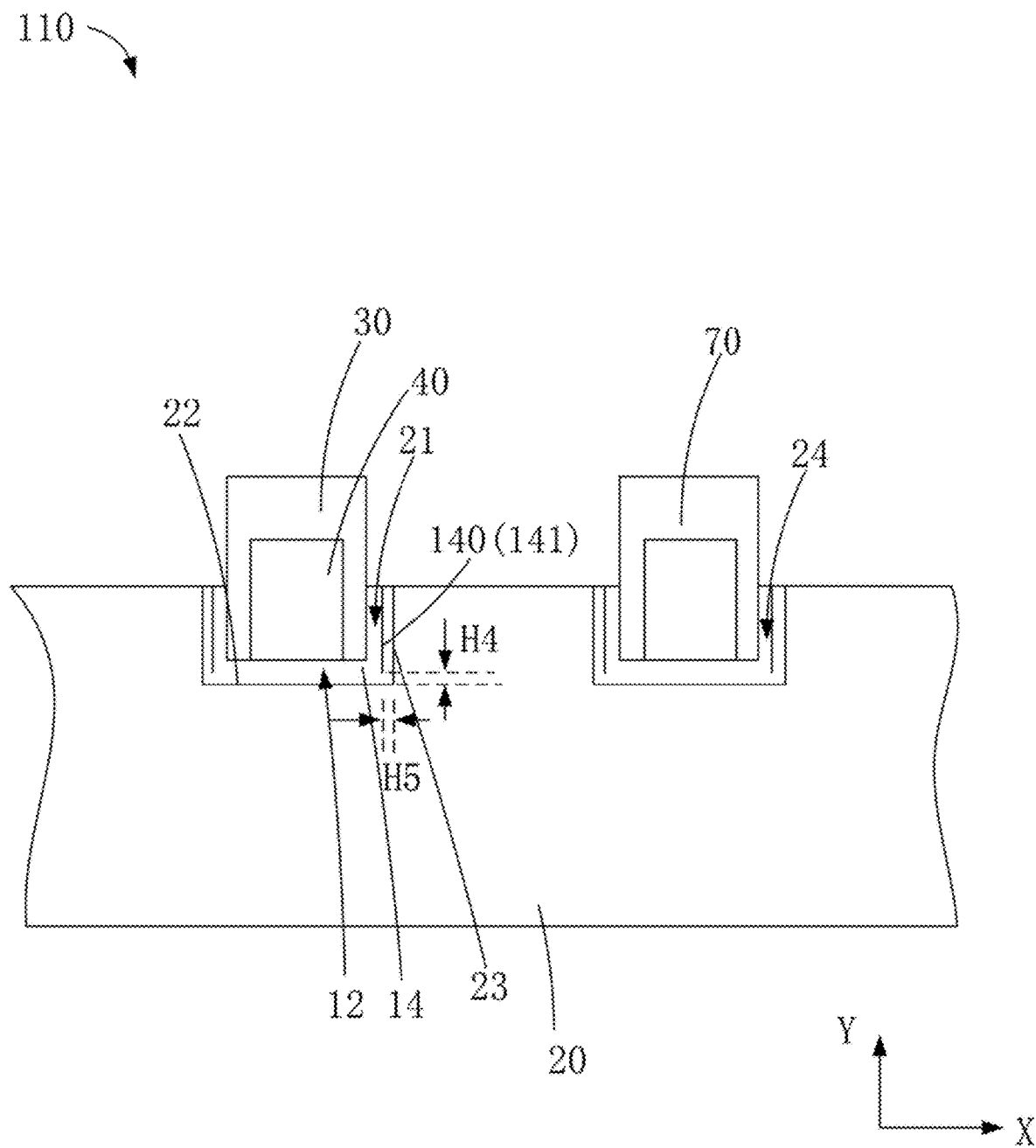
FIG. 6 is a side view of another embodiment of an electrode plate.
Figure 7:
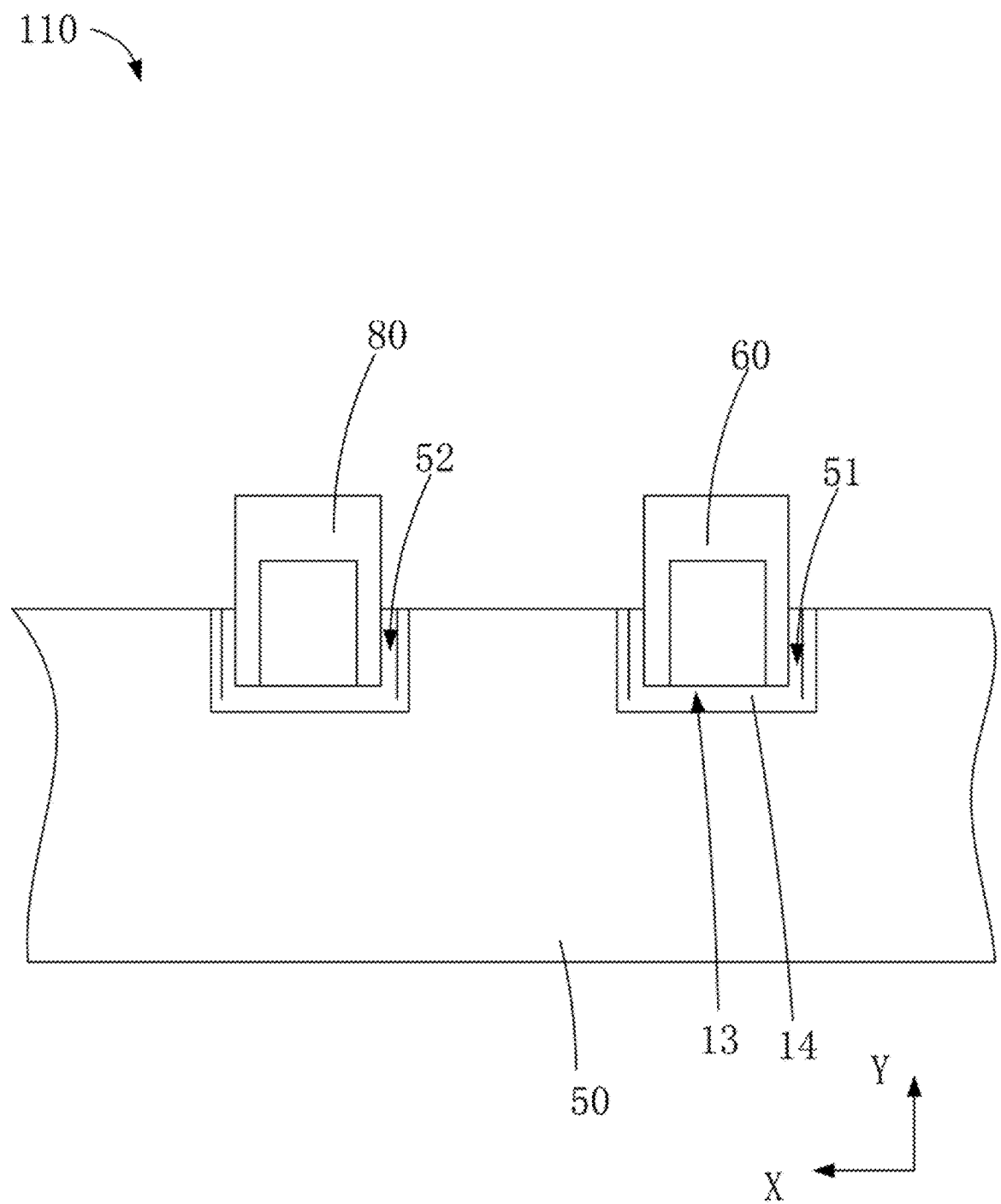
FIG. 7 is similar to FIG. 6, but showing the electrode plate from another angle.
Figure 8:
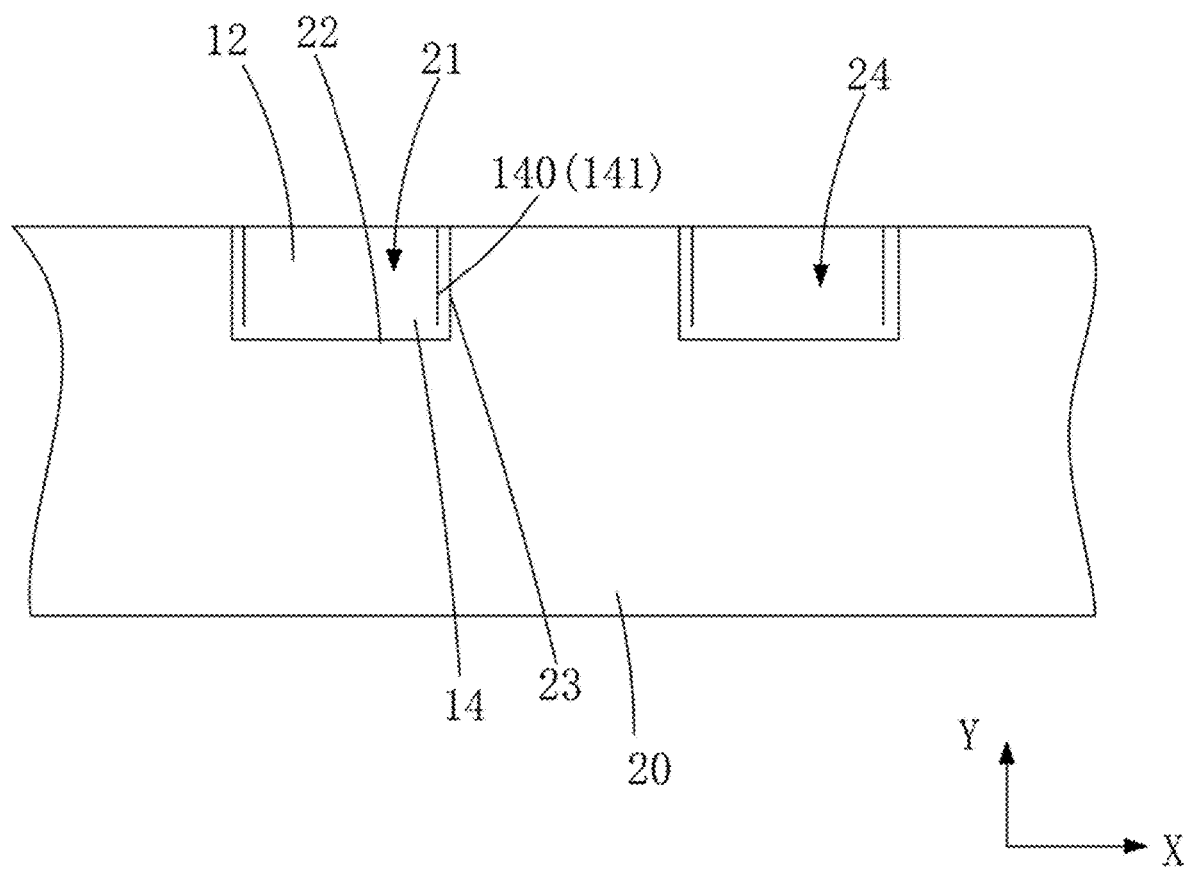
FIG. 8 is a side view of the electrode plate, when an electrode tab and an adhesive layer attached thereon are removed.

FIGS. 6 and 7 illustrate another embodiment of an electrode plate 110. The blank area 14 of the electrode plate 110 includes a side portion 140. The side portion 140 defines a slot 141 that passes through the first metallic layer 12 or the second metallic layer 13 along the thickness direction of the electrode plate 110 (that is, the Z-axis). Referring to FIG. 8, in at least one embodiment, both the first metallic layer 12 and the second metallic layer 13 include the blank area 14. The blank area 14 includes two side portions 140 perpendicular to the length direction of the electrode plate 110 (that is, the X-axis). Each side portion 140 of the blank area 14 defines one slot 141. The slot 141 can be disposed by die cutting, laser cutting, or plasma cutting. Preferably, the slot 141 is disposed by die cutting to cause less whiskers.

Along the width direction of the electrode plate 110 (that is, the Y-axis), the depth of the first receiving groove 21 and/or the second receiving groove 51 is greater than the depth of the slot 141. A difference H4 between the depth of the first receiving groove 21 or the second receiving groove 51 and the depth of the slot 141 is 0.1 mm to 2 mm. Preferably, the difference H4 is 0.5 mm to 1 mm. The first active material layer 20 further includes a sidewall 23 at the region corresponding to the first receiving groove 21. A distance H5 between the slot 141 and the sidewall 23 of the first active material layer 20 is 0.1 mm to 5 mm. Preferably, the difference H5 is 0.5 mm to 2 mm. The second active material layer 50 also includes a sidewall 23 at the region corresponding to the second receiving groove 51. A distance between the slot 141 and the sidewall 23 of the second active material layer 50 can also be 0.1 mm to 5 mm. Preferably, the difference between the slot 141 and the sidewall 23 of the second active material layer 50 is 0.5 mm to 2 mm.

By defining the slot 141 at the blank area 141 of the first metallic layer 12 or the second metallic layer 13, the side of the slot 141 can be separated from the active material layer, facilitating stress release during cold pressing. Thus, crushing and consequent decrease of electrical conductivity of the metallic layer can be avoided.

In another embodiment, the electrode plate 100/110 can further include a third electrode tab 70 and a fourth electrode tab 80. The first active material layer 20 and the second active material layer 50 can further define a third receiving groove 24 and a fourth receiving groove 52 respectively. The third receiving groove 24 faces the fourth receiving groove 52. The third electrode tab 70 is received in the third receiving groove 24, and is electrically connected to the first metallic layer 12. The fourth electrode tab 80 is received in the fourth receiving groove 52, and is electrically connected to the second metallic layer 13. The third electrode tab 70 and the fourth electrode tab 80 can have same structure and material as those of the first electrode tab 30 or of the second electrode tab 60.

In other embodiments, the electrode plate 100/110 can further include a fifth electrode tab, a sixth electrode tab, and so on. The first active material layer 20 and the second active material layer 50 can further define a fifth receiving groove, a sixth receiving groove, and so on. That is, the number of the electrode tabs and the number of the receiving grooves can be varied as needed.

Figure 9:
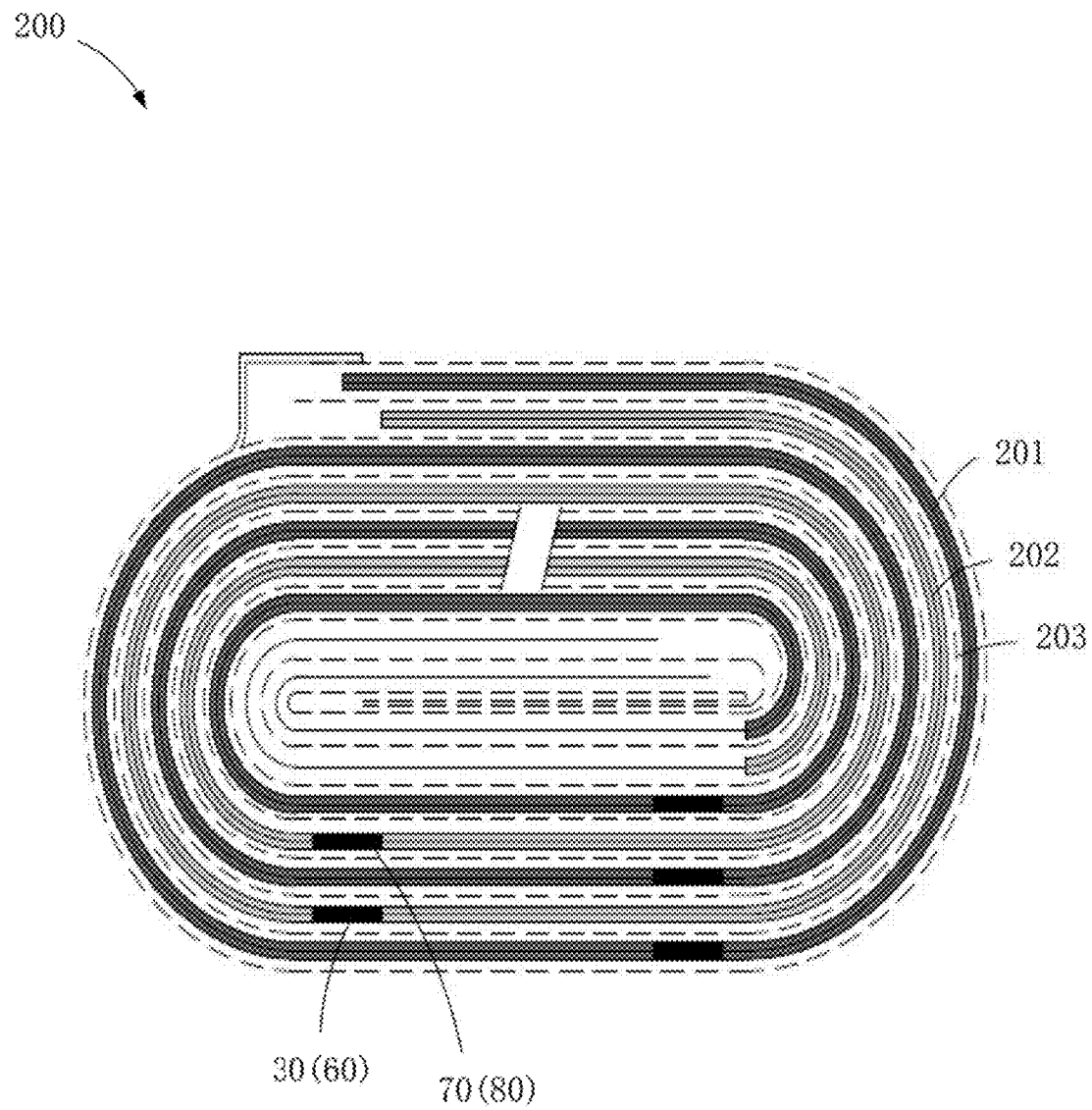
FIG. 9 is a cross-sectional view of an embodiment of an electrode assembly.

FIG. 9 illustrates an embodiment of an electrode assembly 200. The electrode assembly 200 includes a positive electrode plate 201 and a negative electrode plate 202. The positive electrode plate 201 and/or the negative electrode plate 202 include the above electrode plate 100/110. The positive electrode plate 201 and the negative electrode plate 202 are wound to form the electrode assembly 200. The electrode assembly 200 can be applied in a battery cell (not shown). The electrode assembly 200 can further include an isolation film 203.

The first electrode tab 30, the second electrode tab 60, the third electrode tab 70, and the fourth electrode tab 80 overlap each other. The first electrode tab 30, the second electrode tab 60, the third electrode tab 70, and the fourth electrode tab 80 are electrically connected to an electrode tab-lead (not shown) by ultrasonic soldering, brazing, rivet soldering, or conductive adhesive.

COMPARATIVE EMBODIMENT

Positive electrode plate preparation: a composite current collector, including a polymer layer made of PET and two metallic layers made of aluminum, was provided. The thickness of the polymer layer was 11 μm, and the thickness of the metallic layer was 0.36 μm. The composite current collector was to function as a positive current collector. Positive active material of lithium cobalt oxides were coated onto two surfaces of the positive current collector. Then, an aluminum oxide layer, with a thickness of 5 mm, was coated onto each positive active material layer. The product was dried and cold pressed. Undesired blank area was removed by laser cutting, thereby forming the positive electrode plate with electrode tabs of 10×10 mm.

Negative electrode plate preparation: a copper foil was provided, which functions as a negative current collector. Active graphite was coated onto the negative current collector. The product was dried and cold pressed. Undesired blank area was removed by laser cutting, thereby forming the positive electrode plate with electrode tabs.

Battery preparation: the positive electrode plate, a separator, and the negative electrode plate were wound to form a layered battery cell with 11 layers. The positive electrode tabs were electrically connected together by aluminum foil, and were further connected to tab-lead by soldering. The negative electrode tabs were directly connected to tab-lead by soldering. The battery cell was filled with electrolyte, and then encapsulated and formatted to obtain the battery.

Embodiment 1

Positive electrode plate preparation: a composite current collector, including a polymer layer made of PET and two metallic layers made of aluminum, was provided. The thickness of the polymer layer was 11 μm, and the thickness of the metallic layer was 0.36 μm. The composite current collector was to function as a positive current collector. Positive active material of lithium cobalt oxides were coated onto two surfaces of the positive current collector. The product was dried and cold pressed. A receiving groove of 14 mm×5 mm was defined at each positive active material layer by laser cutting, at a position corresponding to the positive electrode tab of COMPARATIVE EMBODIMENT. An electrode tab made of aluminum (length of 10 mm, width of 10 mm, thickness of 10 μm) was connected to each blank area of the positive current collector corresponding to the receiving groove by soldering. The electrode tab was spaced from the sidewall of the receiving groove by 2 mm, and was spaced from the bottom surface of the positive active material layer by 2 mm. A green adhesive layer with a thickness of 10 μm was disposed on the electrode tab. The green adhesive layer could cover the soldering area between the electrode tab and the positive current collector, and did not extend beyond the bottom surface of the positive active material layer. The green adhesive layer was higher than the positive electrode tab by 5 mm.

Negative electrode plate preparation: the same as that of the COMPARATIVE EMBODIMENT.

Battery preparation: the positive electrode plate, a separator, and the negative electrode plate were wound to form a layered battery cell with 11 layers. The positive electrode tabs were connected to tab-lead by soldering. The negative electrode tabs were connected to tab-lead by soldering. The battery cell was filled with electrolyte, and then encapsulated and formatted to obtain the battery.

Embodiment 2

Positive electrode plate preparation: a composite current collector, including a polymer layer made of PET and two metallic layers made of aluminum, was provided. The thickness of the polymer layer was 11 μm, and the thickness of the metallic layer was 0.36 μm. The composite current collector was to function as a positive current collector. Positive active material of lithium cobalt oxides were coated onto two surfaces of the positive current collector. A foam adhesive layer of 14 mm×5 mm was coated onto each positive active material layer at a position corresponding to the positive electrode tab of COMPARATIVE EMBODIMENT. The product was dried, and the foam adhesive layer was torn off to remove the corresponding area of the positive active material layer, thereby forming a receiving groove. The two side portions of each blank area of the positive current collector was cut along the width direction of the electrode plate, to cause the blank area to be connected to the positive active material layer only by the side parallel to the length direction of the electrode plate. The product was further cold pressed. An electrode tab made of aluminum (length of 10 mm, width of 10 mm, thickness of 10 μm) was connected to each blank area of the positive current collector corresponding to the receiving groove by soldering. The electrode tab was spaced from the sidewall of the receiving groove by 2 mm, and was spaced from the bottom surface of the positive active material layer by 2 mm. A green adhesive layer with a thickness of 10 μm was disposed on the electrode tab. The green adhesive layer covered the soldering area between the electrode tab and the positive current collector, and does not extend beyond the bottom surface of the positive active material layer. The green adhesive layer was higher than the positive electrode tab by 5 mm.

Negative electrode plate preparation: the same as that of the COMPARATIVE EMBODIMENT.

Battery preparation: the same as that of the EMBODIMENT 1.

Embodiment 3

Positive electrode plate preparation: a composite current collector, including a polymer layer made of PET and two metallic layers made of aluminum, was provided. The thickness of the polymer layer was 11 μm, and the thickness of the metallic layer was 0.36 μm. The composite current collector was to function as a positive current collector. Positive active material of lithium cobalt oxides were coated onto two surfaces of the positive current collector. The product was dried and cold pressed. A receiving groove of 14 mm×5 mm was defined at each positive active material layer by laser cutting, at a position corresponding to the positive electrode tab of COMPARATIVE EMBODIMENT. An electrode tab in k-shape (for each side of the electrode tab, length of 10 mm, width of 10 mm, thickness of 10 μm) was connected to the blank areas of the positive current collector corresponding to the receiving groove by soldering. The electrode tab was spaced from the sidewall of the receiving groove by 2 mm, and was spaced from the bottom surface of the positive active material layer by 2 mm. A green adhesive layer with a thickness of 10 μm was disposed on the electrode tab. The green adhesive layer covered the soldering area between the electrode tab and the positive current collector, and did not extend beyond the bottom surface of the positive active material layer. The green adhesive layer was higher than the positive electrode tab by 5 mm.

Negative electrode plate preparation: the same as that of the COMPARATIVE EMBODIMENT.

Battery preparation: the same as that of the EMBODIMENT 1.

Embodiment 4

Positive electrode plate preparation: a composite current collector, including a polymer layer made of PET and two metallic layers made of aluminum, was provided. The thickness of the polymer layer was 11 μm, and the thickness of the metallic layer was 0.36 μm. The composite current collector was to function as a positive current collector. Positive active material of lithium cobalt oxides were coated onto two surfaces of the positive current collector. The product was dried and cold pressed. A receiving groove of 14 mm×5 mm was defined at each positive active material layer by laser cutting, at a position corresponding to the positive electrode tab of COMPARATIVE EMBODIMENT. A "one-piece" electrode tab (for the whole electrode tab, length of 10 mm, width of 10 mm, thickness of 20 μm; for each side of the bottom portion, width of 5 mm) was connected to the blank areas of the positive current collector corresponding to the receiving groove by soldering. The electrode tab was spaced from the sidewall of the receiving groove by 2 mm, and was spaced from the bottom surface of the positive active material layer by 2 mm. A green adhesive layer with a thickness of 10 μm was disposed on the electrode tab. The green adhesive layer covered the soldering area between the electrode tab and the positive current collector, and did not extend beyond the bottom surface of the positive active material layer. The green adhesive layer was higher than the positive electrode tab by 5 mm.

Negative electrode plate preparation: the same as that of the COMPARATIVE EMBODIMENT.

Battery preparation: the same as that of the EMBODIMENT 1.

The ohmic resistances of the batteries prepared by the COMPARATIVE EMBODIMENT and the EMBODIMENTs 1-4 at 50% SOC were tested by an ohmmeter. Each battery was tested five times. The results were shown in Table 1.

TABLE 1

| | | Resistance (mΩ) |
|---|---|---|
| COMPARATIVE EMBODIMENT | No. 1 | 34.06 |
| | No. 2 | 50.32 |
| | No. 3 | 80.78 |
| | No. 4 | 20.77 |
| | No. 5 | 101.34 |
| EMBODIMENT 1 | No. 1 | 16.33 |
| | No. 2 | 15.98 |
| | No. 3 | 16.04 |
| | No. 4 | 16.78 |
| | No. 5 | 15.76 |
| EMBODIMENT 2 | No. 1 | 17.45 |
| | No. 2 | 16.82 |
| | No. 3 | 16.56 |
| | No. 4 | 17.01 |
| | No. 5 | 17.23 |
| EMBODIMENT 3 | No. 1 | 16.21 |
| | No. 2 | 16.01 |
| | No. 3 | 15.98 |
| | No. 4 | 16.52 |
| | No. 5 | 15.95 |
| EMBODIMENT 4 | No. 1 | 15.45 |
| | No. 2 | 16.22 |
| | No. 3 | 15.76 |
| | No. 4 | 16.01 |
| | No. 5 | 16.13 |

Table 1 shows that the ohmic resistance of the batteries prepared by EMBODIMENTs 1-4 was smaller than that of the battery prepared by COMPARATIVE EMBODIMENT.

Since the first electrode tab 30 is embedded in the first active material layer 20 but does not protrude from the first metallic layer 12, the thickness of the first electrode tab 30 can be varied according to desired resistance. Thus, a high resistance of the first electrode tab 30 is avoided. Moreover, by defining the slot 141 at the blank area 141 of the first metallic layer 12 or the second metallic layer 13, the side of the slot 141 can be separated from the active material layer, which facilitates stress release during cold pressing. Thus, crushing and consequent decrease of electrical conductivity of the metallic layer are avoided.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An electrode plate comprising:
a composite current collector comprising a polymer layer and a first metallic layer disposed on the polymer layer;
a first active material layer disposed on a surface of the first metallic layer facing away from the polymer layer, the first active material layer defining a first receiving groove at an edge of the first active material layer; and
a first electrode tab received in the first receiving groove and electrically connected to the first metallic layer;
wherein the first metallic layer comprises a blank area, and the blank area faces the first receiving groove, the blank area comprising a side portion, and the side portion defines a slot that passes through the first metallic layer along a thickness direction (Z) of the electrode plate, wherein the slot extends through an outermost edge of the first metallic layer in a width direction (Y) of the electrode plate;
the electrode plate further comprising an adhesive layer, wherein the adhesive layer is disposed on a surface of the first electrode tab facing away from the first metallic layer, the adhesive layer covering at least a welding area (S) between the first electrode tab and the first metallic layer,
wherein the first active material layer comprises a bottom surface opposite to the outermost edge of the first metallic layer in the width direction (Y) of the electrode plate at a region corresponding to the first receiving groove, the bottom surface extending between sidewalls of the first receiving groove, and the adhesive layer does not extend beyond the bottom surface of the first active material layer.

2. The electrode plate of claim 1, wherein the composite current collector further comprises a second metallic layer disposed on a surface of the polymer layer facing away from the first metallic layer;
the electrode plate further comprises a second active material layer and a second electrode tab, and the second active material layer is disposed on a surface of the second metallic layer facing away from the polymer layer;
the second active material layer defines a second receiving groove at an edge of the second active material layer, and the second receiving groove faces the first receiving groove; and the second electrode tab is received in the second receiving groove, and the second electrode tab is electrically connected to the second metallic layer.

3. The electrode plate of claim 2, wherein a top of the first electrode tab away from the first receiving groove is connected to a top of the second electrode tab away from the second receiving groove.

4. The electrode plate of claim 2, further comprising a third electrode tab and a fourth electrode tab, wherein the first active material layer and the second active material layer further define a third receiving groove and a fourth receiving groove, respectively; the third receiving groove faces the fourth receiving groove, the third electrode tab is received in the third receiving groove, and the third electrode tab is electrically connected to the first metallic layer; and the fourth electrode tab is received in the fourth receiving groove, and the fourth electrode tab is electrically connected to the second metallic layer.

5. The electrode plate of claim 1, wherein along a width direction of the electrode plate, a projection of the first electrode tab on the first metallic layer overlaps at least a portion of the first metallic layer, and the welding area (S) is between 20 percent and 100 percent of an overlapping area between the projection of the first electrode tab and the first metallic layer.

6. The electrode plate of claim 1, wherein along a length direction of the electrode plate, a length of the first electrode tab is between 30 percent and 100 percent of a length of the first receiving groove.

7. An electrode assembly comprising:
a positive electrode plate;
a negative electrode plate, the positive electrode plate and the negative electrode plate wind to form the electrode assembly;
wherein at least one of the positive electrode plate and the negative electrode plate comprising:
a composite current collector comprising a polymer layer and a first metallic layer disposed on the polymer layer;
a first active material layer disposed on a surface of the first metallic layer facing away from the polymer layer, the first active material layer defining a first receiving groove at an edge of the first active material layer; and
a first electrode tab received in the first receiving groove and electrically connected to the first metallic layer;
wherein the first metallic layer comprises a blank area, and the blank area faces the first receiving groove, the blank area comprising a side portion, and the side portion defines a slot that passes through the first metallic layer along a thickness direction (Z) of the electrode plate, wherein the slot extends through an outermost edge of the first metallic layer in a width direction (Y) of the electrode plate;
wherein the at least one of the positive electrode plate and the negative electrode plate further comprising an adhesive layer, wherein the adhesive layer is disposed on a surface of the first electrode tab facing away from the first metallic layer, the adhesive layer covering at least a welding area (S) between the first electrode tab and the first metallic layer,
wherein the first active material layer comprises a bottom surface opposite to outermost edge of the first metallic layer in the width direction (Y) of the electrode plate at a region corresponding to the first receiving groove, the bottom surface extending between sidewalls of the first receiving groove, and the adhesive layer does not extend beyond the bottom surface of the first active material layer.

8. The electrode assembly of claim 7, wherein the composite current collector further comprises a second metallic layer disposed on a surface of the polymer layer facing away from the first metallic layer;
the electrode assembly further comprises a second active material layer and a second electrode tab, the second active material layer is disposed on a surface of the second metallic layer facing away from the polymer layer; and
the second active material layer defining a second receiving groove at an edge of the second active material layer, the second receiving groove the first receiving groove, the second electrode tab received in the second receiving groove, and the second electrode tab is electrically connected to the second metallic layer.

9. The electrode assembly of claim 8, wherein a top of the first electrode tab away from the first receiving groove is connected to a top of the second electrode tab away from the second receiving groove.

10. The electrode assembly of claim 8, wherein the at least one of the positive electrode plate and the negative electrode plate further comprises a third electrode tab and a fourth electrode tab; the first active material layer and the second active material layer further defines a third receiving groove and a fourth receiving groove, respectively; the third receiving groove faces the fourth receiving groove, the third electrode tab is received in the third receiving groove, and the third electrode tab is electrically connected to the first metallic layer; and the fourth electrode tab is received in the fourth receiving groove, and the fourth electrode tab is electrically connected to the second metallic layer.

11. The electrode assembly of claim 7, wherein along a width direction of the at least one of the positive electrode plate and the negative electrode plate, a projection of the first electrode tab on the first metallic layer overlaps at least a portion of the first metallic layer, and the welding area (S) is between 20 percent and 100 percent of an overlapping area between the projection of the first electrode tab and the first metallic layer.

12. The electrode assembly of claim 7, wherein along a length direction of the at least one of the positive electrode plate and the negative electrode plate, a length of the first electrode tab is between 30 percent and 100 percent of a length of the first receiving groove.

* * * * *